(12) United States Patent  
Billings

(10) Patent No.: US 11,855,573 B2  
(45) Date of Patent: Dec. 26, 2023

(54) LARGE DYNAMIC RANGE ELECTRIC MOTOR

(71) Applicant: Woods Hole Oceanographic Institution, Woods Hole, MA (US)

(72) Inventor: Andrew S. Billings, North Falmouth, MA (US)

(73) Assignee: WOODS HOLE OCEANOGRAPHIC INSTITUTION, Woods Hole, MA (US)

(*) Notice: Subject to any disclaimer, the term of this patent is extended or adjusted under 35 U.S.C. 154(b) by 419 days.

(21) Appl. No.: 17/272,362

(22) PCT Filed: Oct. 7, 2019

(86) PCT No.: PCT/US2019/055000  
§ 371 (c)(1),  
(2) Date: Mar. 1, 2021

(87) PCT Pub. No.: WO2020/076701  
PCT Pub. Date: Apr. 16, 2020

(65) Prior Publication Data  
US 2021/0328526 A1  Oct. 21, 2021

Related U.S. Application Data

(60) Provisional application No. 62/742,391, filed on Oct. 7, 2018.

(51) Int. Cl.  
*H02P 5/68* (2006.01)  
*H02K 1/30* (2006.01)  
(Continued)

(52) U.S. Cl.  
CPC .............. *H02P 5/68* (2013.01); *H02K 1/30* (2013.01); *H02K 5/132* (2013.01); *H02K 7/10* (2013.01)

(58) Field of Classification Search  
CPC ... H02P 5/68; H02K 1/30; H02K 7/10; H02K 7/003; H02K 16/00  
See application file for complete search history.

(56) References Cited

U.S. PATENT DOCUMENTS

| 3,799,284 A | 3/1974 | Hender |
| 5,426,353 A | 6/1995 | Stuhr et al. |

(Continued)

FOREIGN PATENT DOCUMENTS

| CN | 102882313 A | 1/2013 |
| CN | 106533102 A | 3/2017 |

(Continued)

OTHER PUBLICATIONS

Li et al., "Investigation of a Five-Phase Dual-Rotor Permanent Magnet Synchronous Motor Used for Electric Vehicles", Energies 2014, pp. 3955-3984, vol. 7, doi:10.3390/en7063955.

(Continued)

*Primary Examiner* — Bickey Dhakal  
(74) *Attorney, Agent, or Firm* — Douglas Denninger

(57) ABSTRACT

An efficient, large dynamic range electric motor system and method of operating same, including a frame, at least a first rotor-stator pair, together having a first dynamic range, and a second rotor-stator pair, having a second dynamic range, with the first and second pairs mounted within the frame for rotation about a common central axis of an output shaft, mounted for rotation about the first axis and configured to transfer torque from the first and second pairs. A clutch is configured to isolate at least one of the first and second pairs away from the output shaft, thereby establishing an at least one isolated pair, and preventing torque transfer between the at least one isolated pair and the output shaft. A controller is connected to the first and second pairs and is configured to control power delivery to the first and second pairs.

19 Claims, 5 Drawing Sheets

(51) Int. Cl.
    *H02K 5/132*     (2006.01)
    *H02K 7/10*     (2006.01)

(56) References Cited

U.S. PATENT DOCUMENTS

| | | |
|---|---|---|
| 7,081,730 B1 | 7/2006 | Howard et al. |
| 11,193,562 B1 * | 12/2021 | McGrew, Jr. ............ B60K 1/02 |
| 2008/0088200 A1 | 4/2008 | Ritchey |
| 2008/0269000 A1 * | 10/2008 | Abe ..................... B60W 20/40 |
| | | 475/205 |
| 2010/0261565 A1 | 10/2010 | Al et al. |
| 2010/0295389 A1 | 11/2010 | Tessier et al. |
| 2012/0280585 A1 | 11/2012 | Shaffer |
| 2016/0036308 A1 | 2/2016 | Bailey et al. |

FOREIGN PATENT DOCUMENTS

| | | | |
|---|---|---|---|
| DE | 102008035609 A1 | 2/2010 | |
| JP | H09275667 A | 10/1997 | |
| KR | 102090535 B1 * | 3/2020 | ............. B60L 15/20 |
| WO | WO-2001-044046 A1 | 6/2001 | |
| WO | WO-2016-113264 A2 | 7/2016 | |

OTHER PUBLICATIONS

Ext.EP Search Report, dated Jun. 3, 2022, Billings.

\* cited by examiner

LARGE DYNAMIC RANGE ELECTRIC MOTOR

CROSS-REFERENCE TO RELATED APPLICATION

This application claims priority to U.S. Provisional Application No. 62/742,391 filed on 7 Oct. 2018. The entire contents of the above-mentioned application is incorporated herein by reference.

FIELD OF THE INVENTION

This invention relates to electric motor systems. More specifically, this invention relates to brushless direct current electrical motors and motor systems comprising multiple motor units without an interconnecting transmission.

BACKGROUND OF THE INVENTION

Electrical motors are machines that convert electrical energy into mechanical energy. Typically, electric motors operate by producing a magnetic field and winding currents to generate a rotational force. Electrical sources for electric motors are either in the form of alternating current (AC) sources, such as a power grid, inverters, alternators or other electrical generators, or from direct current (DC) sources, for example batteries, generators in motor vehicles, or rectifiers.

The vast majority of electric motors electromagnetically generate motive force (i.e. relative movement) in an air gap between a stator and rotor to produce useful torque or linear force. The rotor is set to turn about the motor's stator, generating torque, a rotational force. A motor's mechanical power output ($P_{em}$) can be expressed as shown in Equations #1 and #2. Equation #1 has rotation in revolutions per minute (rpm) and torque M in foot-pounds, resulting in units of horsepower. And Equation #2, using SI units, has rotation in shaft angular velocity ω (lower case Greek omega) expressed in radians per second and torque M in newton-meters, resulting in units of watts.

$$P_{em} = \frac{\text{rpm} \times M}{5252} \quad \text{Eq. 1}$$

$$P_{em} = \omega \times M \quad \text{Eq. 2}$$

The efficiency of motor can be calculated as shown in Equation #3, as the mechanical output power $P_m$ divided by the electrical input power $P_e$, expressed as the energy conversion efficiency η (lower case Greek eta), and usually expressed as a percentage. Mechanical output power equals output torque M times output angular velocity and electrical input power equals input current times input voltage, resulting in efficiency Equation #4, enabling the derivation of the efficiency of any given motor.

$$\eta = P_m / P_e \quad \text{Eq. 2}$$

$$\eta = \frac{M \times \omega}{I \times V} \quad \text{Eq. 4}$$

A subset of motors are brushless electric motors. Brushless DC electric (BLDC) motors are synchronous motors powered by DC electricity having a controller that provides pulses of current to the motor windings, thus controlling speed and torque of the motor. Typically, BLDC motors are constructed similarly to permanent magnet synchronous motors (PMSM), but have the ability to be similar to switched reluctance motors, or induction motors.

BLDC motors produce increasing torque (power) as the speed of the motor increases (as measured by rotor rpm or by the resulting drive shaft speed of rotation). As illustrated in FIG. 2A, dashed line 252 depicts the linear relation of power to shaft speed result for a commonly known, single BLDC motor. The dynamic range of a motor is defined herein as the range of the maximal or near-maximal output of a motor. A motor is considered dynamic when output is useful for a given situation, while the motor is operating at a set of conditions (e.g. shaft speed or torque). As also shown in FIG. 2A, single BLDC motors most often have very tight dynamic ranges, as illustrated by two single motors with output power lines 252 and 262. In this example, useful output is considered at or above 75% maximum power, represented by grey bars 254 and 264.

There are two common methods for increasing the dynamic range of a BLDC motor. First, the supplied voltage can be dramatically increased to increase the dynamic range of a single BLDC motor. However, increasing the supplied voltage decreases the motor efficiency, and depletes the power source. When the power source is unlimited (e.g. the power source is the electrical grid) increased power consumption is not a large factor, however when the power source is finite (e.g. a battery), increased power consumption is not ideal, and in many cases unacceptable.

The other common method for increasing dynamic range is the inclusion of a transmission. A transmission is a component in motors and other power transmission systems that provides a controlled application of power. Typically, the term transmission refers to a gearbox that uses gears and gear trains to provide speed and torque conversions for a rotating source (e.g. the motor) to another device (e.g. the driven shaft). Transmissions are utilized with a single motor, the motor having an efficiency at a specific rotational speed range, often at high rotations speeds and the overall device requires slower speeds. The transmission can lower, or reduce, the rotational speed and increase torque. Slower speeds and higher torque are important for starting, or high-power demand work. Thus, a single BLDC motor with a transmission has a larger dynamic range than a single BLDC motor alone.

Transmissions however have significant drawbacks. Mechanical and frictional losses are inherent when forces are applied between the gears of the transmission. And transmissions increase the complexity of the overall motor system, limiting their use in small, space defined systems. Underwater or submerged motors in particular have stringent demands on space, weight and power consumption.

Applying multiple electric motors to rotate a single shaft to gain improvements in power is commonly known in the art, and is exemplified in U.S. Pat. No. 3,799,284 by Hender and in U.S. Patent Application No. 2012/0280585 by Shaffer. Such multiple motor systems use one output shaft per motor, which are then in turn coupled (e.g. geared) to a single rotatable shaft. However, systems with multiple motors and output shafts have similar complexity and losses to transmission systems.

BLDC motors have different power-to-speed ratios. Motors are available that provide low speed and high torque (e.g. start-up motors) and motors are available that provide high speed to low torque ratios. Traditionally, devices have incorporated a single motor best suited for a specific device and provide a transmission to change the rotation speed of the drive shaft. However, that solution provides a small dynamic range where efficiency is only gained during a specific area of use. An example from the combustion engine field is highway driving for motor vehicles.

It is therefore desirable to have a single high dynamic range BLDC motor system that does not rely on increased supply voltage, as well as operating with maximum efficiency in terms of power, space, and weight of the motor.

SUMMARY OF THE INVENTION

An object of the present invention is to provide a high dynamic range electric motor system, as well as operating such a system with maximum efficiency in terms of power, space, and weight of the motor. In some embodiments, the high dynamic range electric motor system operates within a voltage range limits.

This invention features an electric motor system including a frame and a shaft mounted within the frame and configured to rotate about a first axis. The system further includes at least a first rotor-stator pair, together having a first dynamic range, and a second rotor-stator pair, having a second dynamic range, the first and second pairs being mounted within the frame for rotation about the first axis and configured to transfer torque to the shaft. A clutch is configured to isolate at least one of the first and second pairs away from the shaft, establishing an at least a first isolated pair, and preventing torque transfer between the at least one isolated pair and the shaft. A controller is connected to the first and second pairs and is configured to control power delivery to the first and second pairs.

In some embodiments, the system further includes an output mechanism, wherein the shaft drives the output mechanism. In several embodiments, the output mechanism is directly connected to the shaft. In one embodiment, the output mechanism is a hydraulic pump. In certain embodiments, the system further includes a third rotor-stator pair having a third dynamic range and the third pair is connected to the controller, and the controller is further configured to control power delivery to the third pair. In one embodiment, a second clutch is configured to isolate the third pair away from the shaft, establishing a second isolated pair, and preventing torque transfer from the second isolated pair.

In a number of embodiments, the clutch is located between the rotor and stator of the second pair, and is configured to establish the first isolated pair by isolating the second pair's stator from the rotor. In some embodiments, the system further includes a housing, typically water-tight and/or pressure-resistant, in which at least the rotor-stator pairs are disposed. In one embodiment, the system is adapted for use underwater.

This invention also features a method for increasing the dynamic range of an electric motor system, including the steps of (a) selecting a motor system including a frame, a shaft mounted within the frame and configured to rotate a about a first axis, at least a first and second rotor-stator pairs mounted for rotation within the frame and configured to transfer torque to the shaft, a clutch configured to isolate at least one of the first and second motors from the shaft, a power supply and a controller. The first and second motors have a first and second dynamic range, respectively, and the controller is connected to the first and second pairs. The method further includes (b) operating the motor at a first configuration with at least one of the first and second motors, and (c) isolating at least one of the first and second pairs from the shaft with the clutch to establish a first isolated pair by preventing torque transfer between the shaft and the at least one isolated pair, and a first engaged pair capable of transferring torque to the shaft. The method also includes (d) operating the motor system at a second configuration with the first engaged pair.

In some embodiments, the method further includes (e) operating the motor system at a third configuration with the first and second motors. In certain embodiments, the method also includes (i) connecting the motor to an output mechanism. In a number of embodiments, the output mechanism is directly connected to the shaft. In certain embodiments, the motor further comprises a third rotor-stator pair having a third dynamic range and the third pair is connected to the controller, and the controller is further configured to control power delivery to the third pair. In one embodiment, the motor system further comprises a second clutch configured to isolate the third pair away from the shaft, establishing a second isolated pair, and preventing torque transfer between the shaft and the second isolated pair. In some embodiments, the clutch is located between the rotor and stator of the second pair, and is configured to establish the first isolated pair by isolating the second pair's stator from the rotor. In one embodiment, the motor system further comprises a water tight housing and further comprising the step of (ii) operating the motor underwater.

Definitions

The terms "motor" and "rotor-stator pair" as used herein refers to a matched rotor and a stator. The rotor is attached to an output shaft and is capable of turning the output shaft when driven by the stator. The stator is paired to the rotor, creating a rotor-stator pair, to provide a magnetic field configured to rotate the rotor, and thus rotating the output shaft. In a system according to the present invention, two or more rotor-stator pairs are configured to rotate about a common axis with the output shaft, defined as the "central axis" below.

The term "central axis" refers herein to the rotational axis of the output shaft. This axis is typically also the longitudinal axis of the output shaft, and is preferably the center axis for the motors (i.e. the first and second motors) present in a given embodiment.

The term "dynamic range" is used herein to refer to a range of motor operation above a set condition. For example, as illustrated in FIG. 2A, the dynamic range according to one embodiment is established to be at 75% or greater of max output power of a motor system. In another embodiment and illustrated in FIGS. 2B and 2C, dynamic range is established to be at 60% and greater efficiency of a motor system.

The term "configuration" when used to refer to the operation of a motor (i.e., a rotor-stator pair) refers herein to a set of operational parameters of the motor, including power input, rotating speed, and torque output of the motor.

BRIEF DESCRIPTION OF THE DRAWINGS

In what follows, preferred embodiments of the invention are explained in more detail with reference to the drawings, in which.

DETAILED DESCRIPTION OF THE PRESENTLY PREFERRED EMBODIMENTS

Overview

Figure 2A:
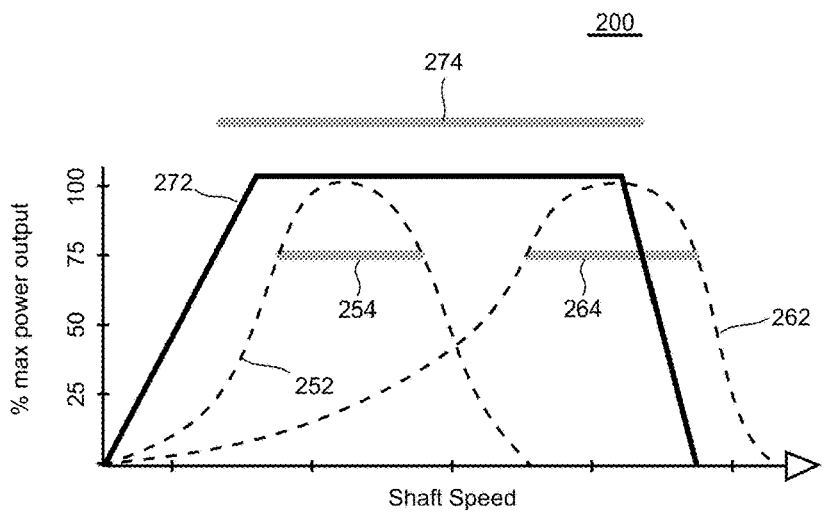
FIG. 2A is a representative power curve graph for two torque-controlled conventional single motors (dashed lines) and a novel, dual motor system according to one embodiment of the present invention, illustrating the power-to-speed relationship of two commonly known BLDC motors and an embodiment of the present invention having two BLDC motors coupled to a single drive shaft and a clutch mechanism.
Figure 2B:
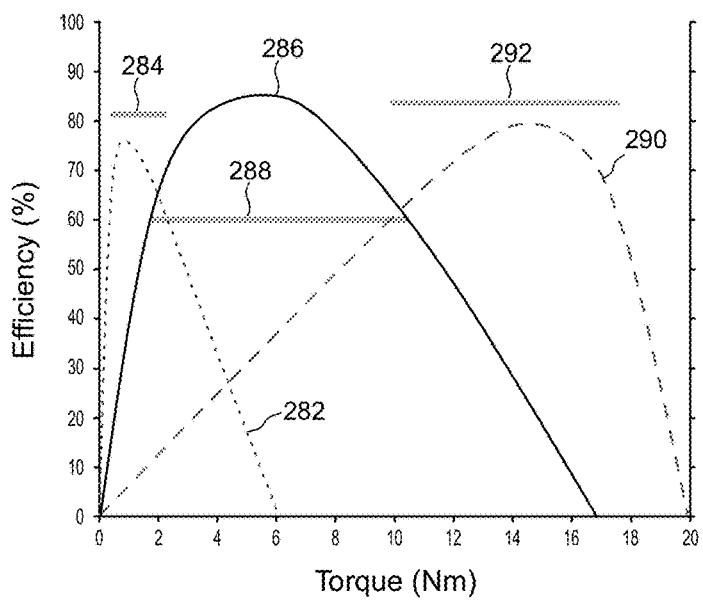
FIGS. 2B and 2C are representative efficiency graphs comparing three individual motors efficiency over a range of torques (FIG. 2B) against an embodiment of the present invention shown in FIG. 3, having three motors coupled to a single shaft (FIG. 2C)
Figure 2C:
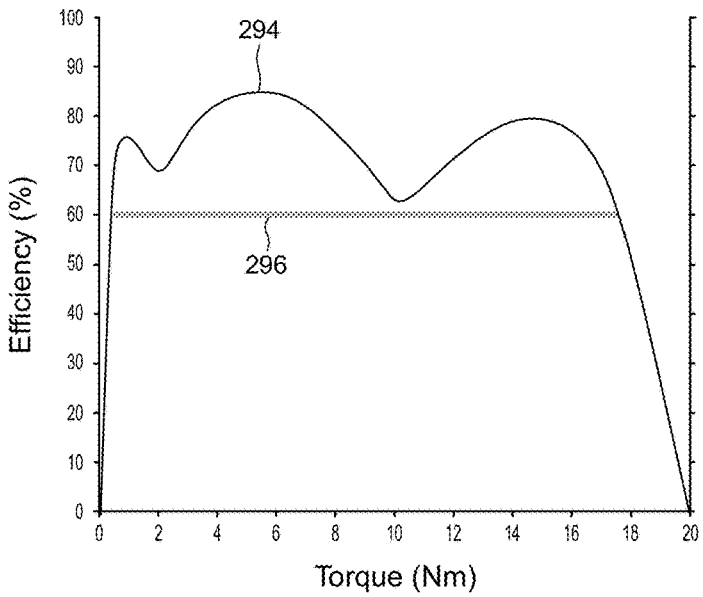

This invention may be accomplished by selecting a plurality of electric motors, each motor having a dynamic range of motor speed and supplied torque. The selected motors are applied to a common drive shaft. The drive shaft and motors are reversibly connectable, such that a single motor or a subset of motors can apply force to the drive shaft at a time. The resulting motor system has a large dynamic range of power to shaft speed. FIGS. 2A-2C illustrate the dynamic nature of the present invention. Illustrated in FIG. 2A is a demonstration of the present invention's extended power output over a range of shaft speeds, as compared to a single motor known in the art. FIG. 2C illustrates the efficiency of one embodiment of the present invention having three motors over a range of provided torques, as compared to three individual motors not connected as enabled by the present invention in FIG. 2B.

Turning to FIG. 2A, solid line 272 represents the power output at a range of rotor speeds of a two-motor embodiment according to the present invention as compared to the power output of a commonly known single motor system. The dynamic range 274 of the dual motor embodiment spans a much greater shaft speed range than that of prior art motors, represented by dashed lines 252 and 262, each motor having a dynamic range defined as 75% and above of maximum power output and represented as grey bars 254 and 264, respectively.

Combining multiple motors to a single shaft allows embodiments of the present invention to take advantage of different motor's efficiencies at different speeds and torques. Three individual motor's efficiency graphed against their respective torque outputs are illustrated in FIG. 2B. First, second, and third motors have efficiency curves of 282, 286 and 290, respectively, when operated each on their own shaft. These motors may be combined as described herein, attached to a single output shaft 102 along with two clutch mechanism 116 and 126, enabling driving the output shaft 102 with the appropriate motor at its most efficient torque and speed ratings, resulting in the single efficiency curve 294 without the use of any additional gearing or transmissions, and the mechanical losses associated with said gearing or transmissions.

The motors depicted in FIGS. 2B and 2C can also be expressed as having a dynamic range. One dynamic range is defined and illustrated in FIGS. 2B and 2C, as having at least 60% efficiency. The first, second and third motors have dynamic ranges of 284, 288, and 292, respectively. While the motor combined according to the present invention has a significantly larger dynamic range of 296.

Reversible connection may be achieved by electromechanically decoupling (disconnecting) the motors to the drive shaft, or by a mechanical clutching mechanism incorporated into the drive shaft (e.g. a spraug clutch). Motor and clutch control is provided by an electronic controller. The motor system then achieves a large dynamic range by applying a single motor at its optimal speed and torque dynamic range, and then applying a different motor with a different optimal speed and torque dynamic range. The motor system accomplishes large dynamic range without including a transmission, limiting the complexity, size and weight of the system.

Figure 1A:
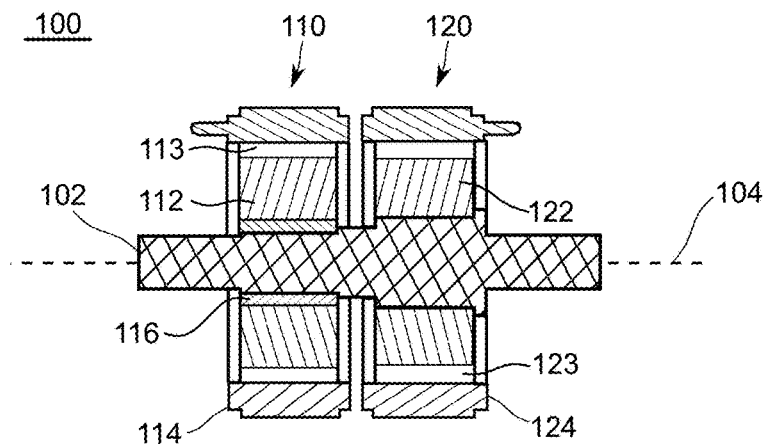
FIG. 1A is a schematic cross-sectional view of a motor system having two motors according to the present invention.
Figure 1B:
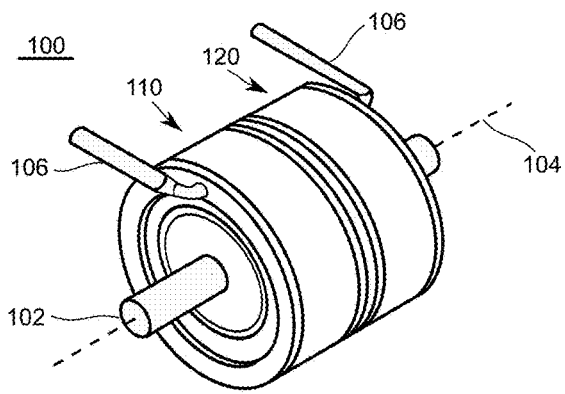
FIG. 1B is a schematic perspective view of the motor system of FIG. 1A.

System 100, of one embodiment is illustrated in FIG. 1A, comprising at least two motors 110 and 120, each motor having different dynamic performances. One way to refer to motors with different dynamic performances, is to refer to the motor's speeds at which it is efficient. For example, a first motor comprising Allied Motion's MF0127056-X0X motor is referred herein as a low-speed motor, because it is approximately 66.5% efficient at 200 rpm, while having a no-load speed of about 333 rpm and a peak torque of about 4900 oz-in (ounce-inch). A second motor is defined by its speed, but also in relation with the first motor. Therefore, a second motor comprising the MF0127092-X0Y is referred herein as a high-speed motor, because it is approximately 90% efficient at 1560 rpm, while having a no-load speed of about 1950 rpm and a peak torque of about 8400 oz-in.

In the embodiment shown in FIG. 1A, motor 110 has a low-speed rotor 112, and a low-speed stator 114 that is separated from rotor 112 by air gap 113. Motor 110 further comprises a clutching mechanism 116, referred simply herein as a clutch. It should be understood that the clutch term refers to any clutching mechanism, including electromagnetic decoupling mechanism as well as mechanical clutches (e.g. a spraug clutch, described below). Clutch 116 allows rotor 112 to be disconnected from the output shaft (e.g. drive shaft) 102, thereby isolating low-speed motor 110 from shaft 102 and allowing motor 120 to be utilized to rotate shaft 102. High-speed motor 120, described in more detail below, has a rotor 122 and a stator 124 that is separated from rotor 122 by air gap 123.

The present invention may be performed with many different motor- and drive-shaft arrangements, as long as multiple motors (i.e. rotor-stator pairs) are attached to the same shaft 102, with at least one motor having a clutch 116.

Figure 1C:
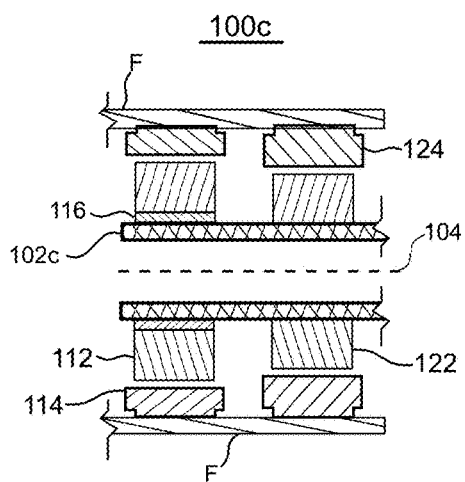
FIGS. 1C and 1D are schematic cross-sectional views of two additional embodiments of motor systems having two motors according to the present invention.
Figure 1D:
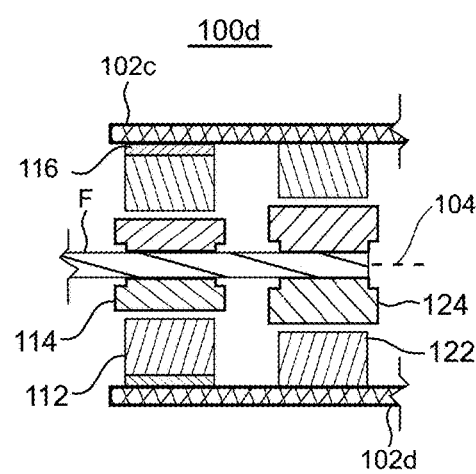

Additional manifestations are depicted in FIGS. 1C and 1D. A hollow core motor system 100c is illustrated in FIG. 1C, having the components described above, except shaft 102c is hollow. Shaft 102c, still rotates about central axis 104, and rotor 112 is still isolatable from shaft 102c by clutch 116. Another hollow core embodiment is illustrated in FIG. 1D. Motor system 100d has a frame F internal to the shaft 102c and stators 114 and 124 securely attached to the frame F. Shaft 102c rotates about the central axis 104, and is connected to clutch 116 and rotor 122. Rotor 112 is attached to clutch 116. These alternative embodiments operate with the same principles as described in detail elsewhere herein and are to be considered within the scope of the present invention.

Motors 110,120

The present invention provides a system including at least two motors on a common shaft 102. For simplicity of description, the term "motor" used herein refers to a machine that supplies motive force (torque) for another device often by a output shaft 102, the motor comprising a rotor and a stator. The rotor represents the movable component of the motor, is attached to the output shaft and turns said shaft when driven by the stator. Typically, rotors have conductors which carry currents and that interact with magnetic fields of the stator, thereby creating a turning force. The stator in turn surrounds the rotor and is typically stationary. The stator has windings or permanent magnets for producing a magnetic field that acts on the rotor. The rotor and stator are matched to produce proper and efficient turning force. In some embodiments, the rotor further comprises a spacer to physically position the rotor, and clutch if present, onto the shaft.

The present invention provides for at least two motors, specifically two sets of matched rotor-stator pairs. For simplicity, the matched rotor-stator pairs are referred to as the first and second pairs. The first and second pairs typically have different speed-torque dynamic ranges. By having different ranges, the pairs complement each other; in other words, the first pair is efficient for a first task, but not a second task, while the second pair is efficient for the second task. For example, in one embodiment, a first motor 110 is selected for low speed, high torque for device start up (e.g. a first task), and a second motor 120 is selected for high speed, low torque, for device operation (e.g. a second task). The first and second pairs are preferably commercially available motor kits. Most often, commercially available frameless BLDC motor kits.

The rotor-stator pairs are configured around a common output shaft 102, such that each rotor of the motors drives the rotation of the output shaft around the central, longitudinal axis 104.

Embodiments of the invention may comprise as many rotor-stator pairs as appropriate. The currently preferred embodiment comprises two pairs, a slow speed pair making a first motor 110 and a fast speed pair making a second motor 120. Some embodiments comprise more than two rotor-stator pairs, for example a three rotor-stator pair system described in Example 1. Typically 2 to 10 pairs are preferred. Embodiments with more than 10 pairs are within the scope of the invention, but the increase in overall dynamic range with the addition of more rotor-stator pairs declines as the number of pairs increase, decreasing the utility at large pair numbers.

Output Shaft 102

The rotors 112, 122 of motors 110, 120 are connected to an output shaft 102 in order to transfer the rotor rotation (i.e. motor output) to the shaft and to do productive work. An output shaft, also referred to as a motor drive shaft, or simply as a shaft, are well known in the art. Some embodiments further comprise a variable diameter output shaft as shown in FIG. 1A.

Clutch 116

The present invention provides a clutching component and method to isolate, disengage or otherwise remove at least one rotor-stator pair motor from transferring torque from the output shaft 102 to the rotor-stator pair, referred herein for one embodiment as a clutching mechanism 116 or as a clutch 116. Output shaft 102 is connected to the at least two motors, and at least one motor is configured with a clutching mechanism 116; whereby clutch 116 may disengage the pair, but more specifically the rotor, from the output shaft 102, such that when the high speed second motor 120 is turning the shaft 102, the clutch 116 prevents the shaft's movement to turn the rotor 112 of the low speed first motor 110. The clutch 116 may be any suitable decoupling mechanism. The clutch 116 may isolate or otherwise remove one motor in a mechanical, electromagnetic, or physical manner. The clutch may be referred in singularity, or in plural for embodiments with more than one clutch, for example the embodiment shown in FIG. 3 comprising clutch 116 in first motor 110 and clutch 126 in motor 120. In some embodiments, the system comprises a plurality of clutches, and more than one motor has a clutch. In other embodiments, all of the plurality of motors have clutches, for example, the motor 130 of the embodiment illustrated in FIG. 3 may further comprise clutch 136 (not shown). In embodiments with multiple clutches, the clutches may be the same construction and disengage each motor in the same way, or may be of different construction and disengage their respective motors by a different method.

In the currently preferred embodiment, clutch 116 comprises a spraug clutch. A spraug clutch is a one-way freewheel clutch having non-revolving asymmetric figure-eight shaped spraug rollers (also referred to as spraugs). When rotational force is applied in the correct direction, the spraug rollers rotates slip, or free-wheel. However, when torque is reversed, the spraug rollers tilt, producing a wedged shape and prevent free-wheeling, and therefore transferring the rotational force though the clutch.

The clutch 116 as described herein operates similarly to an overrunning clutch, which is a device inside a transmission that disengages a drive shaft from a driven shaft when the driven shaft rotates faster than the drive shaft. Typical overrunning clutches are included when two or motors drive the same machine. Importantly, in these systems, each motor has its own independent drive shaft, which is then geared together for both motors to act on the single driven shaft. Here the present invention's clutch 116 disconnects a motor from the common drive shaft (output shaft) 102, allowing another motor to propel the same shaft. Importantly, unlike an overrunning clutch, the present invention has no need for a transmission. In some embodiments, the clutch comprises bearings, often ball bearings.

Controller C

Control of the system is provided by an interconnected electronic control box, referred herein to as the controller C. Motor controllers are known in the art, see U.S. Pat. No. 7,081,730 by Howard et al. for motor controllers, incorporated in entirety by reference herein. The controller C must be capable of operating the plurality of rotor-stator pairs, controlling their state (e.g. on/off), polarity, and handling the power supply (which is often receiving AC electricity) and supplying the correct DC phase to the pair from the AC waveform. In some embodiments, the controller C further controls at least the clutch 116 and a power source PS. The controller C described herein may include multiple individual controller boards, each board connected to a single motor, a single board connected to more than one motor, or a combination thereof.

Power Source PS

The present invention provides an electric motor system. Such a system will rely on a power source PS. Typical power sources are known in the art, including the electrical grid, a battery or battery packs, a generator (e.g., driven by solar, wind, wave, and/or thermal energy). Some embodiments further include an inverter to convert between AC and DC electricity. In other embodiments, the controller C is configured to convert between AC and DC electricity. In some embodiments the controller acts as both a controller and a pass through of the power source PS.

Frame

Figure 4:
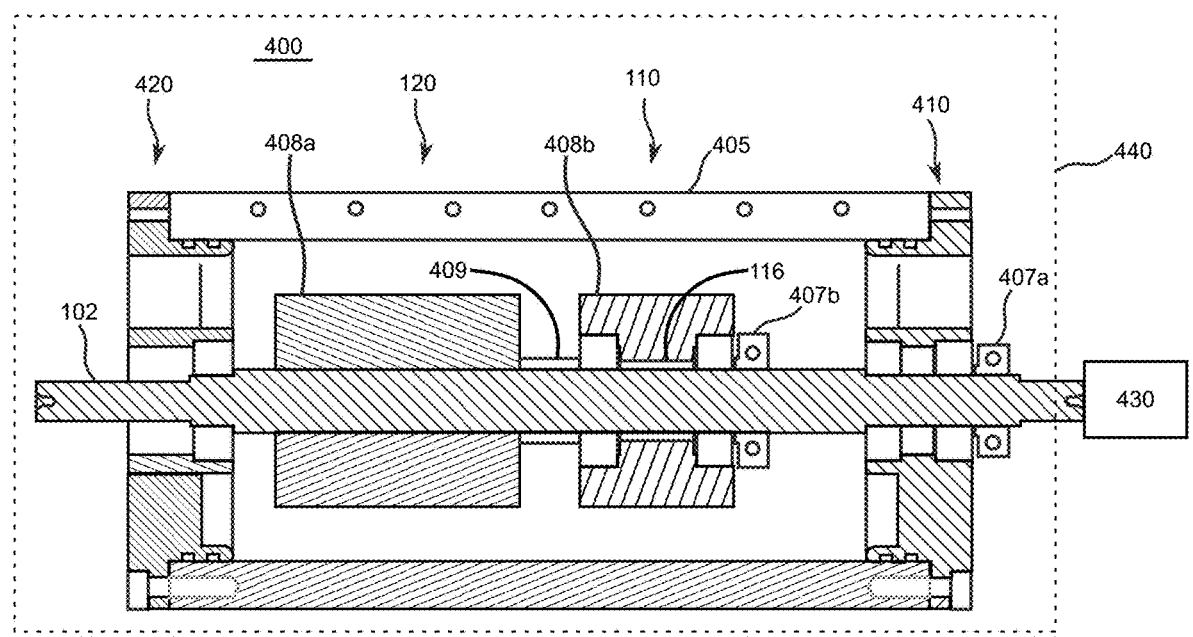
FIG. 4 is a cross-sectional view of a motor system having two motors, according to one embodiment.
Figure 5A:
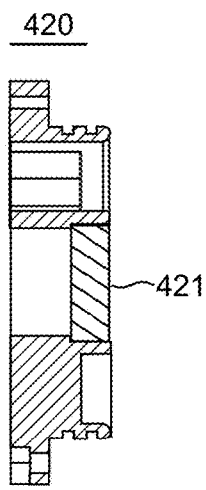
FIGS. 5A, 5C, 5D, and 5G are cross-sectional views of several components of the system depicted in FIG. 4.
Figure 5B:
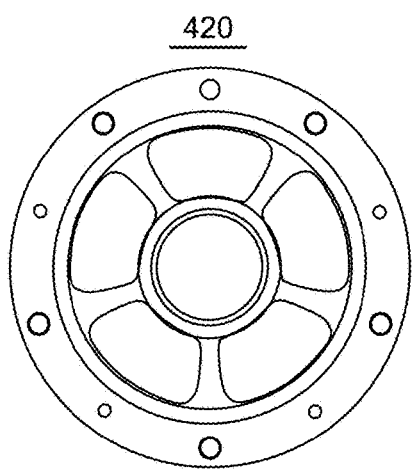
FIG. 5B is an end view of the angular contact bearing end cap depicted in FIG. 5A.
Figure 5C:
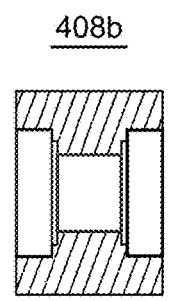
Figure 5D:
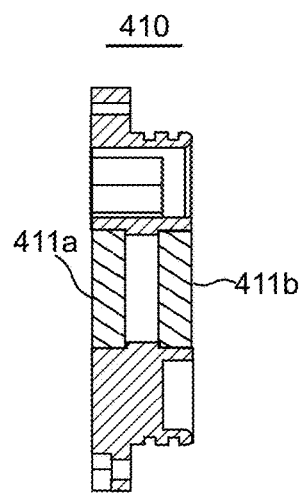
Figure 5E:
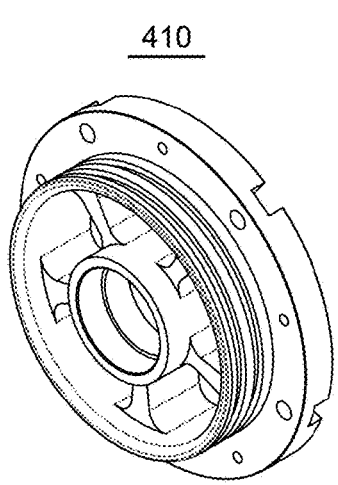
FIG. 5E is a perspective view of the ball bearing end cap depicted in FIG. 5D.
Figure 5F:
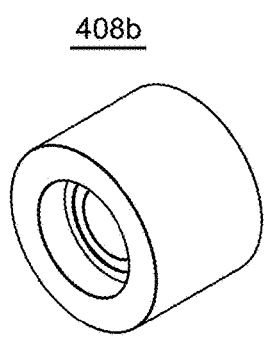
FIG. 5F is a perspective view of the axial spacer depicted in FIG. 5C.
Figure 5G:
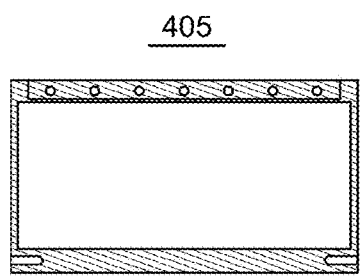
Figure 5H:
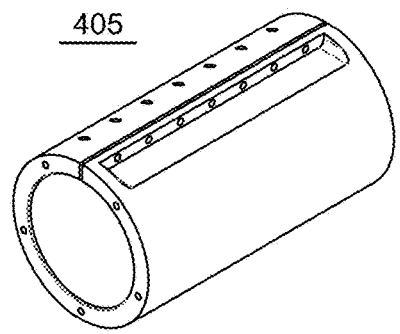
FIG. 5H is a perspective view of the cylinder clamp depicted in FIG. 5G.

In most embodiments of the present invention, a frame F is provided to constrain and support the inventive motor system. The frame may be any suitable material, depending on the embodiment. In some embodiments the frame F surrounds the system, completely enclosing the system 400, except for the shaft 102, as illustrated in FIG. 4. In certain embodiments, the frame constrains stators 114 and 124 by clamping, that is, a single piece of material is shaped in a cylinder with a longitudinal opening, and fasteners 406 are used to tighten and secure the structure, such as shown in FIG. 4. In other embodiments, the frame comprises an encompassing cylinder without longitudinal openings, and is shrink fit onto the stators, that is it is heated to allow the stators to be placed inside the frame F, and the stators are held securely in place once the cylinder has lost the added heat. In some embodiments, the system 100 has one or more supports 106 extending to the frame F for support without the system 100 being surrounded by the frame F.

Example 1

Figure 3:
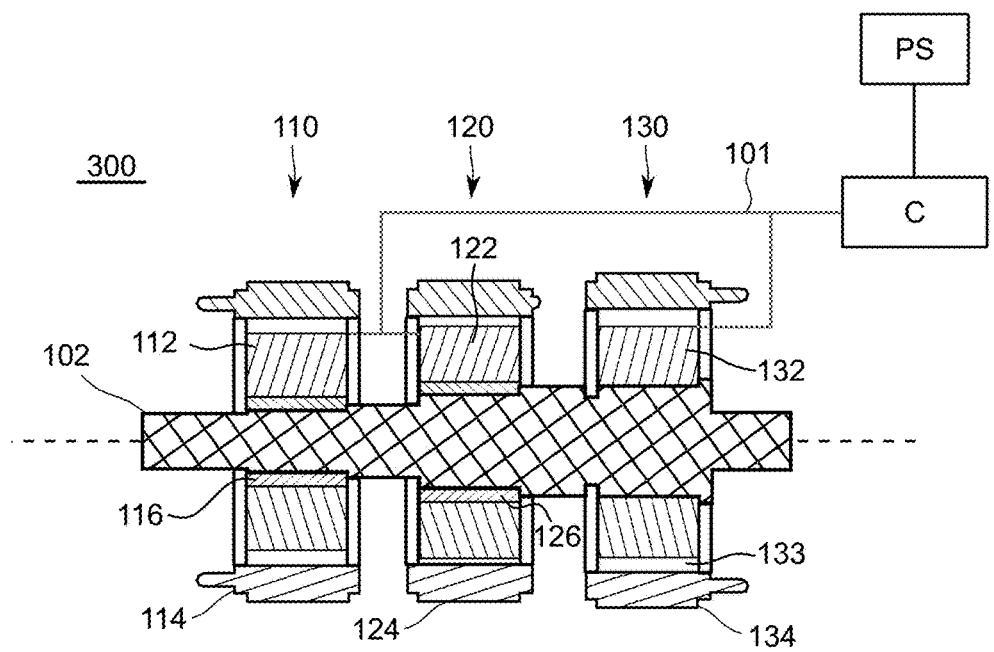
FIG. 3 is a schematic cross-sectional view of a motor system having three motors according to one embodiment of the present invention.

An embodiment with more than two rotor-stator pairs will now be described as a specific example. Illustrated in FIG. 3 is a transmission-less, direct drive motor system 300 having an output shaft 102, a first motor 110, a second motor 120 and a third motor 130, enabling a motor system with a large dynamic range without the need for additional transmissions or gearing and their associated losses. Like two rotor-stator motor systems described above, each motor is preferably is an off the shelf, commercially available motor kit, each with differing torque and speed performance ratings. In this example the first motor 110 is a low speed, high torque motor efficient for machine start-up, the second motor 120 is a mid-range speed and torque motor efficient at lower torque than start up, but still not high speed needs, and the third motor 130 is a high speed, low torque motor efficient at at-speed operation (e.g. cruising speed).

In some embodiments, frame F is further attached to and supplemented by, or replaced, by a housing such as housing 440 shown in phantom in FIG. 4. The housing 440 provides a sealed, internal environment protecting from the outside environment, most often harsh and/or fluid environments that would be otherwise detrimental to the inventive system 400. Typically, the housing 440 provides protection against at least one of corrosion, fluid ingress (e.g., it is water-tight), pressure, electricity (such as high-voltage spikes), air, and dirt. Suitable housings for motor systems are well known in the art. Typically, motors 110 and 120, clutch 116, and controller C are within the housing. Typically, embodiments with additional motors would be placed within the housing 440. Output shaft 102 spans the protective housing 440 enabling the system 400 to connect to the output mechanism 430 outside of housing 440. Preferably, a mechanism is placed about the output shaft 102 to enable the shaft 102 to leave the housing 440 without compromising the housing's protection, for example an o-ring, or other well-known mechanism. The housing 440 may have additional connections, ports or otherwise protected openings for other structural and functional components (e.g. data and power connections out of system 400).

In this example both first motor 110 and second motor 120 comprise a clutch mechanism 116 and 126. Clutch 116 enables the system to operate second motor 120, and in some situations both second motor 120 and third motor 130 simultaneously, while disengaging first motor 110 from shaft 102. Controller C is connected to at least motors 110, 120, and 130 via a standard connection 101 to instruct in operation and provide power. Clutches 116 and 126 may further be connected to controller C. In addition, clutch 126, along with clutch 116, enables system 300 to isolate motors 110 and 120 to operate the motor system 300 with high speed, low torque motor 130 alone.

Example 2

Several aspects of the present invention will not be discussed in relation to a specific example, illustrated, in FIGS. 4 and 5A-5H. In this example, a dynamic motor system 400 has two rotor-stator pair motors from Allied Motion's MF0127 series of frameless motors. The low speed, high torque FM0127092 is first motor 110, and the high speed, low torque FM0127056 is second motor 120; specifications for each motor are shown in Table 1. The clutch 116 is commercially available from McMaster-Carr Sprague clutch 6392K49, allowing for one-way engagement of the shaft 102. Additional components of this example include a primary shaft 102, an axial load clamp 407a, an axial rotor clamp 407b, a plain side rotor spacer 408a for the first motor 110, a clutch side rotor spacer 408b for the second motor 120, a center axial spacer 409, a cylinder clamp 405, angular contact bearings 411 and an associated end cap 410, and ball bearings 421 and an associated end cap 420.

The axial load clamp 407a (e.g. a shaft collar), holds the bearings and associated components onto the shaft 102 and preventing sliding under torque and axial loads, while situating these components for the overall system 400. Rotor and axial spacers 408a and 408b enable the attached components (e.g. the rotors) to be properly aligned and centred within the system 400. The axial rotor clamp 407b ensures the proper fastening of components to shaft 102. In this Example, the cylinder clamp 405 ensures the proper fastening of components and, in this construction, replaces the frame F. In this embodiment, the clamps comprise a machined groove onto the shaft and fastening the appropriate component with an external retaining ring.

Angular contact bearings 411 enable the system 400 to accommodate combined loads that is simultaneously acting radial and axial loads. Angular contact bearings 411 have displaced inner and outer ring raceways, relative to each raceway in the direction of the bearing axis. The axial load carrying capacity of angular contact bearings 411 increases as the contact angle increases. The contact angle is defined as the angle between the line joining the points of contact of the ball and the raceways in the radial plane, along which the combined load is transmitted from one raceway to another, and a line perpendicular to the bearing axis. In this embodiment, the bearing axis is the central axis 104.

A Marzocchi ALP gear pump 430 is connected to the shaft 102 to act as the load of the system 400. The pump 430 acts as a dynamometer (dyno) to measure force output of system 400, as well as the hydraulic output mechanism.

TABLE 1

|  | MF0127092-XOY 2$^{nd}$ motor 120 | MF0127056-X0X 1$^{st}$ motor 110 |
|---|---|---|
| Peak Torque ±25% (oz-in) | 8414 | 4899 |
| Peak Current ±15% (Amps) | 126 | 12.6 |
| Torque Sensitivity ±10% (oz-in/A) | 67 | 390 |
| No Load Speed (rpm) | 1952 | 334 |
| Voltage Constant ±10% (V/krpm) | 49 | 288 |
| Efficiency at speed (% at rpm) | 90 at 1560 | 66.5 at 200 |

A Copley Xenus Plus XPL-230-40 controller C is provided to control both the first motor 110 and second motor 120, FIG. 3. This controller C further provides safe torque off (STO) capabilities enabling disconnect of the output stage without disabling the controller C, and has a standard wall power outlet for simplified power (i.e. electrical) supply PS to the controller C. The controller C is operated in torque control mode and may communicate with an additional controller (e.g. for autonomy control) by a standard rs-232 port.

Fields of Use

The present invention may be utilized in almost any field of use that utilizes motors. The invention is especially adapted for uses that need or can benefit from at least two steps or configurations of power. More particularly, the present invention is well suited for uses when the power supply and space available is limited, e.g. small, battery-operated machines. The present invention also benefits systems that have weight limits. The present invention may be incorporated into pumps, vehicles, machine tools, hand tools, and the like. The invention may be utilized to directly drive a mechanical system (e.g. a drill bit), or a hydraulic or pneumatic actuator.

One field of use example would be incorporation of the invention into a typical electric hand tool. In this example, hand tools typically have two settings, normal power setting and high-power setting. The first rotor-stator pair 110 would provide turning force while when the tool is in normal power setting. When switched to high power setting, the tool would switch to using the second rotor-stator pair 120.

Mode of Use

Figure 6:
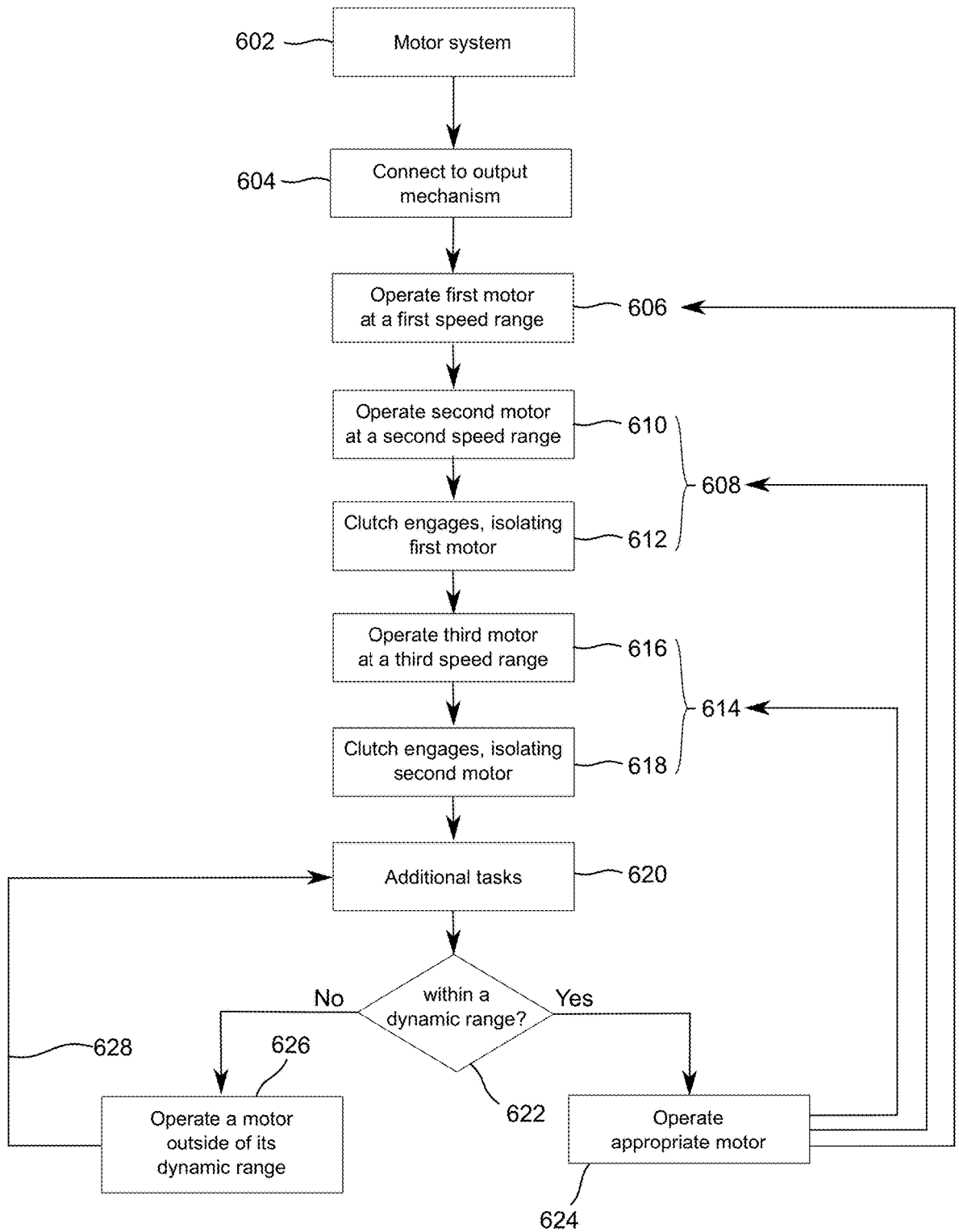
FIG. 6 is a flow chart of one possible method of operation of the system depicted in FIG. 3 with performance characteristics graphed in FIGS. 2B and 2C.

One possible method of operation of one embodiment of the present invention will now be detailed as steps depicted in FIG. 6. An approximate motor system is selected in step 602 by a user. In this example, the selected motor is the motor system 300 illustrated in FIG. 3, the selected motor has more than one motor, and has the appropriate dynamic range for the needs of a user. Each motor of the motor system 300 is efficient in a desired seed and torque range. In this example method, the selected motor system 300 has a first motor 110, a second motor 120 and a third motor 130, having a first, second and third dynamic ranges, respectively, each dynamic range combining to represent the system's 300 overall dynamic range 296 as depicted in FIG. 2C. Second and third motors 120 and 130 further comprise clutches 116 and 126. System 300 further comprises a controller C connected to a power source PS, and an output shaft 102.

Selected motor is connected to an output mechanism 430 (e.g. a hydraulic pump operating a mechanical claw), step 604. The motor system 300 is operated using the first motor at a first task, step 606. The first task may be, for example, operating the hydraulic pump to cause the mechanical claw to grasp an object of interest, which often requires low speed, high torque output. The system 300 operates during the first task within a first speed range to send output force to the hydraulic pump. Operating the first motor within its dynamic range results in efficient use of the motor system 300 and efficient draw-down of the power source (e.g. batteries) PS.

Once the motor system 100 has completed its first task, the system 100 may perform a second task 608, most often requiring the shaft 102 to operate at higher speeds, with lower torque. An example of a second task is to move the mechanical claw from the point of grasping to a collection vessel for storing the object of interest. To enact the second task, the controller C instructs the second motor 120 to propel shaft 102 to a second speed, depicted as step 610 in FIG. 6. The clutch 116 automatically engages, depicted as step 612, in the first motor 110, to isolate the first motor 110 from the shaft 102, and preventing the second motor 120 from driving rotor 112, preventing drag and system 300 inefficiency. During the second task, the motor system can operate within the dynamic range of the second motor 120, most often operating the second motor within a second speed range, step 610, extending the dynamic range of the overall system, providing extended efficiency as compared to single motor systems, or motor systems with transmissions.

The system 300 may perform a third task 614, the task taking advantage of the third motor's 130 dynamic range. Much like when switching to the second motor 120, the controller C performs step 616, operating the third motor 130 within a third speed range. The clutch 126 in the second motor 120 automatically disengages, step 618, the second motor from the shaft 102. If the third speed range is within the third motor's 130 dynamic range, the overall efficiency of the motor system 300 is again extended.

The motor system 300 may perform additional tasks 620. The controller C determines, in step 622, if the desired operation is within the dynamic range of any of the first, second or third motors. If the additional task is within a motor's dynamic range, as depicted with step 624, the system 300 will engage or disengage the respective clutches, and power the appropriate motor as described above. If the controller determines, in step 626, that the desired operation is not within the dynamic range of any of the motors, the system 300 can operate the motor with the highest efficiency at that speed and torque configuration. After this, less efficient task is completed, the system 300 will again assess a following task's requirements, as step 628, and the best motor to engage, and to disengage the other motors.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. An electric motor system configured to accomplish a plurality of tasks, comprising:
   a frame;
   a shaft, mounted within the frame and configured to rotate about a first axis;
   at least a first brushless DC electric ("BLDC") motor having a first rotor-stator pair, together having a first dynamic range at an efficiency of at least sixty percent, the first BLDC motor having a first peak torque and a first no-load speed at a first rpm, and a second BLDC motor having a second rotor-stator pair, having a second dynamic range at an efficiency of at least sixty percent, the second BLDC motor having a second peak torque and a second no-load speed at a second rpm, wherein the second peak torque is higher than the first peak torque and the second rpm is higher than the first rpm, the first and second pairs being mounted within the frame for rotation about the first axis and configured to transfer torque to the shaft;
   a clutch configured to isolate at least one of the first and second pairs away from the shaft, establishing an at least a first isolated pair, and preventing torque transfer between the at least one isolated pair and the shaft; and
   a controller connected to the first and second pairs and configured to control power delivery to the first and second pairs, wherein the controller, for each task, powers whichever motor can operate within its dynamic range to accomplish that task.

2. The system of claim 1, further comprising an output mechanism, wherein the shaft drives said output mechanism.

3. The system of claim 2 wherein the output mechanism is directly connected to the shaft.

4. The system of claim 2 wherein the output mechanism is a hydraulic pump.

5. The system of claim 1 further comprising a third rotor-stator pair having a third dynamic range and the third pair is connected to the controller; wherein the controller is further configured to control power delivery to the third pair.

6. The system of claim 5 further comprising a second clutch configured to isolate the third pair away from the shaft, establishing a second isolated pair, and preventing torque transfer from the second isolated pair.

7. The system of claim 1 wherein the clutch is located between the shaft and the rotor of the first pair, and is configured to establish the first isolated pair by isolating the rotor of the first pair from the shaft, and wherein no clutch isolates the second motor from the shaft.

8. The system of claim 1 further comprising a water-tight housing in which at least the rotor-stator pairs are disposed and wherein the system is configured for use underwater.

9. A method for increasing the dynamic range of an electric motor system to accomplish a plurality of tasks, comprising:
   (a) selecting a motor system including a frame, a shaft mounted within the frame and configured to rotate a about a first axis, at least a first brushless DC electric ("BLDC") motor having a first rotor-stator pair, together having a first dynamic range at an efficiency of at least sixty percent, the first BLDC motor having a first peak torque and a first no-load speed at a first rpm, and a second BLDC motor having a second rotor-stator pair, having a second dynamic range at an efficiency of at least sixty percent, the second BLDC motor having a second peak torque and a second no-load speed at a second rpm, wherein the second peak torque is higher than the first peak torque and the second rpm is higher than the first rpm, the first and second rotor-stator pairs mounted for rotation within the frame and configured to transfer torque to the shaft, a clutch configured to isolate at least one of the first and second motors from the shaft, a power supply and a controller, wherein the controller is connected to the first and second pairs;
   (b) operating the motor system at a first speed range with at least one of the first and second motors by powering whichever motor can operate within its dynamic range to accomplish a first task;
   (c) isolating at least one of the first and second pairs from the shaft with the clutch to establish a first isolated pair by preventing torque transfer between the shaft and at least the first isolated pair, and to establish a first engaged pair capable of transferring torque to the shaft; and
   (d) operating the motor system at a second speed range with the first engaged pair by powering whichever motor can operate within its dynamic range to accomplish a second task which differs from the first task.

10. The method of claim 9, further comprising the step of (i) connecting the motor system to an output mechanism.

11. The method of claim 10, wherein the output mechanism is directly connected to the shaft.

12. The method of claim 10, wherein the motor system further comprises a water-tight housing, at least the rotor-stator pairs are disposed within the housing, and further comprising the step of (ii) operating the motor underwater.

13. The method of claim 9, wherein the motor system further comprises a third rotor-stator pair having a third dynamic range and the third pair is connected to the controller; wherein the controller is further configured to control power delivery to the third pair.

14. The method of claim 13, wherein the motor system further comprises a second clutch configured to isolate the third pair away from the shaft, establishing a second isolated pair, and preventing torque transfer between the shaft and the second isolated pair.

15. The method of claim 14, wherein the motor system operates at a third speed range when the second isolated pair is established, and wherein the controller, for each task, powers whichever motor can operate within its dynamic range to accomplish that task.

16. The method of claim 9, wherein the clutch is located between the shaft and the rotor of the first pair, and is configured to establish the first isolated pair by isolating the rotor of the first pair from the shaft, and wherein no clutch isolates the second motor from the shaft.

17. A method for increasing the dynamic range of an electric motor system to accomplish a plurality of tasks, comprising:
   (a) selecting a motor system including a frame, a shaft mounted within the frame and configured to rotate a about a first axis, at least a first brushless DC electric ("BLDC") motor having a first rotor-stator pair, together having a first dynamic range at an efficiency of at least sixty percent, the first BLDC motor having a first peak torque and a first no-load speed at a first rpm, and a second BLDC motor having a second rotor-stator pair, having a second dynamic range at an efficiency of at least sixty percent, the second BLDC motor having a second peak torque and a second no-load speed at a second rpm, wherein the second peak torque is higher than the first peak torque and the second rpm is higher than the first rpm, the first and second rotor-stator pairs mounted for rotation within the frame and configured to transfer torque to the shaft, a clutch configured to isolate the first motor from the shaft, a power supply and a controller, wherein the controller is connected to the first and second pairs, and wherein the motor system does not include a transmission and the second motor is not contacted by any clutch;

(b) connecting the motor system to an output mechanism;

(c) operating the motor system at a first speed range by powering the first motor when the first motor is operatable within the first dynamic range to drive the output mechanism and accomplish a first task;

(c) isolating the first pair from the shaft with the clutch to establish a first isolated pair by preventing torque transfer between the shaft and at least the first isolated pair, and to establish a first engaged pair capable of transferring torque to the shaft; and (d) operating the motor system at a second speed range by powering the second motor as the first engaged pair when the second motor is operatable within the second dynamic range to drive the output mechanism and accomplish a second task which differs from the first task.

18. The method of claim 17 wherein the motor system further comprises a water-tight housing, at least the rotor-stator pairs are disposed within the housing, and further including operating the motor underwater.

19. The method of claim 18 wherein the output mechanism is a hydraulic pump.

* * * * *